(12) United States Patent
Takahashi

(10) Patent No.: US 7,788,921 B2
(45) Date of Patent: Sep. 7, 2010

(54) SHAPE MEMORY ALLOY ACTUATOR

(75) Inventor: Masaya Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 245 days.

(21) Appl. No.: 12/168,458

(22) Filed: Jul. 7, 2008

(65) Prior Publication Data

US 2009/0013684 A1     Jan. 15, 2009

(30) Foreign Application Priority Data

Jul. 10, 2007     (JP) ............... 2007-180833

(51) Int. Cl.
*F01B 29/10*     (2006.01)
*F02G 1/04*     (2006.01)
*H02N 10/00*     (2006.01)
*H02K 33/00*     (2006.01)
*H02P 3/00*     (2006.01)

(52) U.S. Cl. ............ 60/528; 60/527; 310/307; 318/117; 318/119

(58) Field of Classification Search ........... 60/527–529; 310/306–307
See application file for complete search history.

(56) References Cited

U.S. PATENT DOCUMENTS

| | | | | |
|---|---|---|---|---|
| 4,987,314 A | * | 1/1991 | Gotanda et al. | 250/551 |
| 5,211,371 A | * | 5/1993 | Coffee | 251/11 |
| 6,516,146 B1 | * | 2/2003 | Kosaka | 396/55 |

FOREIGN PATENT DOCUMENTS

JP     57-141704     9/1982

OTHER PUBLICATIONS

Kodama, K., et al, "Position Control of Shape Memory Alloy Actuator Using Hysteresis Model", Collected papers of Japan Society of Mechanical Engineers, Series C, Dec. 1992, pp. 120-125, vol. 65, No. 640 together with English translation.

* cited by examiner

*Primary Examiner*—Thomas E Denion
*Assistant Examiner*—Christopher Jetton
(74) *Attorney, Agent, or Firm*—Scully, Scott, Murphy & Presser, P.C.

(57) ABSTRACT

To provide a shape memory alloy actuator using a shape memory alloy that mechanically restrains a moving body in position to prevent oscillation, the actuator has a moving body pushing member adapted to be capable of abutting to the moving body, a bias spring for the moving body pushing member that exerts an external force on the moving body pushing member in the direction opposite to the direction of change in the shape of a shape memory wire caused by heating, a bias spring for the moving body that exerts an external force on the moving body in the direction same as the direction of change, a first stopper that restricts the movement of the moving body to a predetermined position upon cooling. One end of the shape memory wire is fixed, the other end is mechanically linked with the moving body pushing member. The moving body pushing member and the moving body are moved by deformation caused by heating, and the moving body and the moving body pushing member are separated, when the moving body is stopped at the position of the first stopper.

5 Claims, 5 Drawing Sheets

SHAPE MEMORY ALLOY ACTUATOR

CROSS-REFERENCE TO RELATED APPLICATION

The present application is based upon and claims the benefit of priority from the prior Japanese Patent Application No. 2007-180833 filed on Jul. 10, 2007; the entire contents of which are incorporated herein by reference.

BACKGROUND OF THE INVENTION

1. Field of the Invention

The present invention relates to a shape memory alloy actuator.

2. Description of the Related Art

A shape memory alloy changes its shape with phase transformation caused by a change in the temperature. Actuators that utilize deformation of such a shape memory alloy have characteristics that are advantageous in reducing the size and weight of the actuators.

For example, Japanese Patent Application Laid-Open No. 57-141704 teaches to change the shape of a shape memory alloy by supplying an electrical current to it and to measures its resistance that changes with the change in the shape thereby controlling contraction and expansion of the shape memory alloy. Thus, this document discloses a technology in which the actuator itself functions also as a sensor.

In an actuator that uses a shape memory alloy wire, it is desirable that resistance feed back control be performed by measuring the resistance of the shape memory alloy thereby controlling the position of a moving body, as is the case with the above described prior art.

SUMMARY OF THE INVENTION

The above described conventional method, however, suffers from a problem as described, for example, in Kazuyuki Kodama et al. "Position Control of SMA Actuator Using Hysteresis Model" Collected Papers of Japan Society of Mechanical Engineers, Series C, Vol. 65, No. 640 (December 1992). Specifically, when the resistance of shape memory alloy is controlled to a predetermined target resistance by resistance feedback control in order to restrain the position of a moving body, oscillation of the moving body that occurs when the resistance of the shape memory alloy is close to the target resistance cannot be suppressed completely.

The present invention has been made in view of the above described situation and has as an object to provide a shape memory alloy actuator using a shape memory alloy in which the position of a moving body is restrained mechanically to prevent oscillation.

To solve the above described problem and achieve the object, according to the present invention, there is provided a shape memory alloy actuator that transmits a change in the shape of a shape memory alloy caused by a change in the temperature to a moving body to change the position of the moving body, comprising a fixed member to which one end of the shape memory alloy is fixed, a moving body pushing member to which the other end of the shape memory alloy is mechanically linked, a first bias member that exerts an external force on the moving body pushing member in a direction opposite to a direction of change in the shape of the shape memory alloy caused by heating, a second bias member that exerts an external force on the moving body in a direction same as the direction of change in the shape of the shape memory alloy caused by heating, a first stopper that restricts movement of the moving body to a predetermined position with respect to a direction of movement of the moving body caused upon heating the shape memory alloy, and a second stopper that restricts movement of the moving body to a predetermined position with respect to a direction of movement of the moving body caused upon cooling the shape memory alloy, wherein the moving body is disposed in such a way as to be capable of being in contact with the moving body pushing member, and the moving body and the moving body pushing member are separated apart when the moving body is in a state in which it is restrained at the position of the first stopper after movement of the moving body pushing member and the moving body caused by a change in the shape of the shape memory alloy by heating.

According to another aspect of the present invention, there is provided a shape memory alloy actuator that transmits a change in the shape of a shape memory alloy caused by a change in the temperature to a moving body to change the position of the moving body, comprising a hollow tube member through which the shape memory alloy passes, one end of the tube member being fixed to one end of the shape memory alloy, a moving body pushing member mechanically linked with the other end of the shape memory alloy, a support member to which the other end of the tube member is fixed, a first bias member that exerts an external force on the moving body pushing member in a direction opposite to a direction of change in the shape of the shape memory alloy caused by heating, a moving body that is moved with the moving body pushing member by a change in the shape of the shape memory alloy, a second bias member that exerts an external force on the moving body in a direction same as the direction of change in the shape of the shape memory alloy caused by heating, a first stopper that restricts movement of the moving body to a predetermined position with respect to a direction of movement of the moving body caused upon heating the shape memory alloy, and a second stopper that restricts movement of the moving body to a predetermined position with respect to a direction of movement of the moving body caused upon cooling the shape memory alloy, wherein the moving body is disposed in such a way as to be capable of being in contact with the moving body pushing member, and the moving body and the moving body pushing member are separated apart when the moving body is in a state in which it is restrained at the position of the first stopper after movement of the moving body pushing member and the moving body caused by a change in the shape of the shape memory alloy by heating.

According to a preferred mode of the present invention, it is desirable that the second bias member be an elastic member having different diameters at both ends.

According to a preferred mode of the present invention, it is desirable that the elastic modulus of the second bias member be smaller than the elastic modulus of the first bias member.

According to a preferred mode of the present invention, it is desirable that the tube member be resilient.

DETAILED DESCRIPTION OF THE INVENTION

In the following, embodiments of the shape memory alloy actuator according to the present invention will be described in detail with reference to the accompanying drawings. It should be understood that the present invention is not limited by the embodiments.

Figure 1:
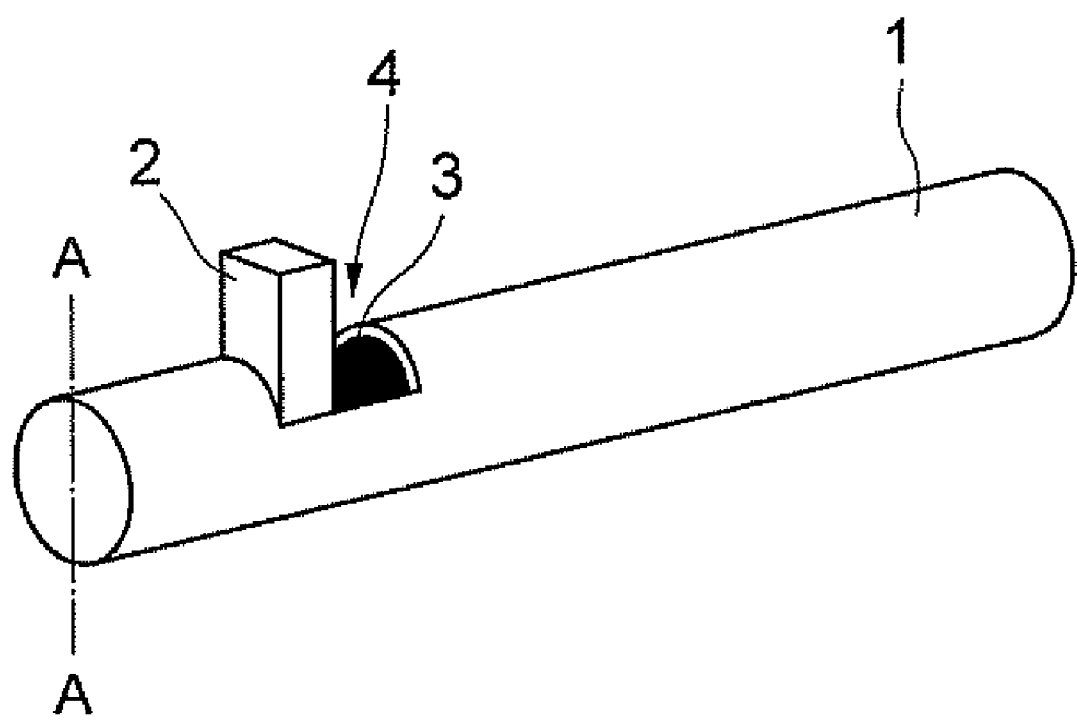
FIG. 1 is a perspective view of a shape memory alloy actuator according to a first embodiment of the present invention.

FIG. 1 is a perspective view of a shape memory alloy actuator according to a first embodiment of the present invention. A cylinder 1 has a groove 4 formed thereon. A moving body 2 that constitutes a drive portion of the actuator extends to the exterior of the cylinder 1 through the groove 4. The moving body 2 may be joined to an external movable portion to thereby drive this specific movable portion.

In the interior of the cylinder 1 are provided a bias spring 51 for the moving body, a moving body pushing member 3, a bias spring 52 for the moving body pushing member and a shape memory wire 6, as will be descried in detail later. The shape memory wire 6 used here is a wire made of a shape memory alloy that contracts when heated and expands when cooled.

FIGS. 2A, 2B, 2C and 2d are longitudinal cross sectional views of the shape memory alloy actuator taken along line A-A in FIG. 1. FIGS. 2A to 2D illustrate changes in the positions of the parts in the interior of the cylinder 1 caused by changes in the status of the shape memory wire 6 in the first embodiment. Both ends of the groove 4 function as stoppers that restrain the position of the moving body 2 when it is driven. For the sake of description, the end of the groove 4 that is located on the side of the bias spring 51 for the moving body will be referred to as stopper 41 (the second stopper), and the end of the groove 4 that is located on the side of the bias spring 52 for the moving body pushing member will be referred to as stopper 42 (the first stopper).

The moving body 2 is exposed to the exterior of the cylinder 1 through the groove 4. A stress acting rightward in FIGS. 2A to 2D is produced in the moving body 2 by the bias spring 51 for the moving body. In the state shown in FIG. 2A, the moving body pushing member 3 is in contact with the moving body 2 in the interior of the cylinder 1. A stress acting leftward in FIGS. 2A to 2D is produced in the moving body pushing member 3 by the bias spring 52 for the moving body pushing member. The moving body pushing member 3 is joined with the shape memory wire 6. The shape memory wire 6 passes through the bias spring 52 for the moving body pushing member and is fixed to a wire fixing member 11 provided at one end of the cylinder 1.

Figure 2A:
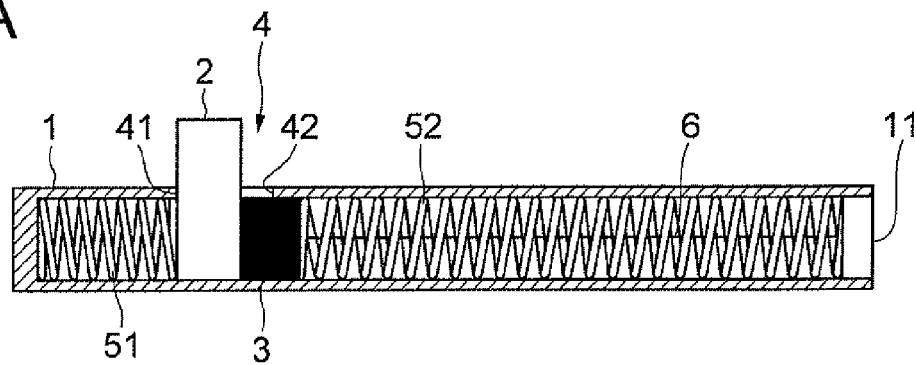
FIGS. 2A, 2B, 2C and 2D illustrate operation of the shape memory alloy actuator according to the first embodiment.

In FIG. 2A, the elastic force (or modulus of elasticity) of the bias spring 52 (first bias member) for the moving body pushing member is designed to be larger than the elastic force (or modulus of elasticity) of the bias spring 51 (second bias member) for the moving body. In other words, the modulus of elasticity of the second bias member is smaller than the modulus of elasticity of the first bias member. FIG. 2A shows the state in which the moving body 2 is kept stationary at the position of the stopper 41. In this state, the length of the shape memory wire 6 is larger than the length of the bias spring 52 for the moving body pushing member.

Figure 2B:
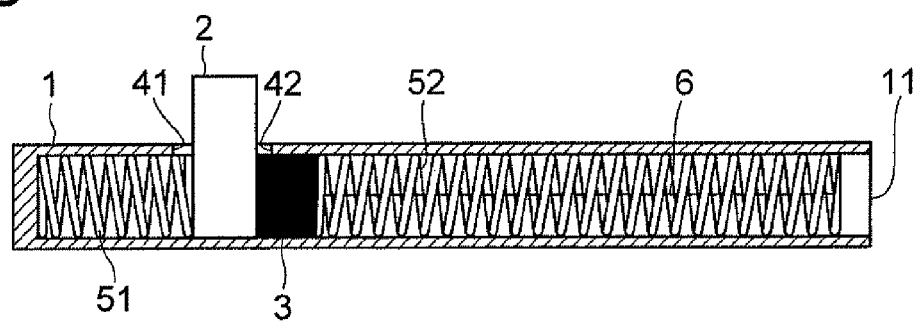

FIG. 2B illustrates the operation of the actuator in a state in which the shape memory wire 6 is heated with electric power supply. The power supply apparatus is not shown in the drawings. The shape memory wire 6 contracts by phase transformation. The contraction force of the shape memory wire 6 is stronger than the stress of the bias spring 52 for the moving body pushing member. Therefore, the moving body pushing member 3 is displaced in the direction of contraction of the shape memory wire 6. The moving body 2 is displaced by the effect of the bias force exerted thereon by the bias spring 51 for the moving body by a distance equal to the displacement of the moving body pushing member 3.

Figure 2C:
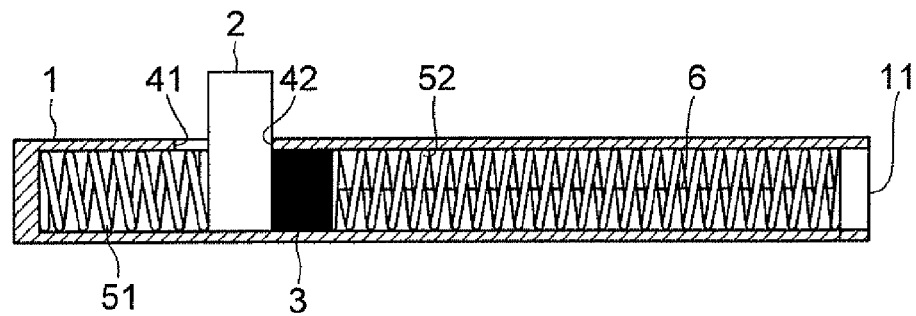

FIG. 2C illustrates the operation of the actuator in a state in which the shape memory wire 6 has been further heated by an increased power supply and the amount of contraction of the shape memory wire 6 has been increased. The moving body pushing member 3 moves in the direction of contraction of the shape memory wire 6. With the movement of the moving body pushing member 3, the moving body 2 is displaced to the position of the stopper 42. In this state, the moving body 2 is kept stationary at the position of the stopper 42 by the stress of the bias spring 51 for the moving body.

Figure 2D:
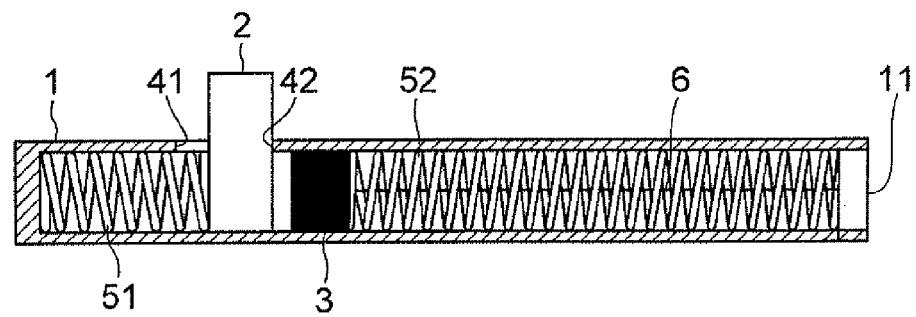

FIG. 2D illustrates the state in which the shape memory wire 6 has been further heated from the state shown in FIG. 2C, and the amount of contraction of the shape memory wire 6 has been further increased. The moving body pushing member 3 has been further moved from the position shown in FIG. 2C in the direction of contraction of the shape memory wire 6. In this state, the moving body 2 is kept stationary at the position of the stopper 42 in the same manner as in FIG. 2C even though the moving body pushing member 3 has been displaced. Thus, in the state in which the moving body pushing member 3 and the moving body 2 have been moved by the change in the shape of the shape memory wire 6 caused by heating and the moving body 2 is restrained at the position of the first stopper 42, the moving body 2 and the moving body pushing member 3 are spaced apart.

Since the amount of contraction of the shape memory wire 6 is controlled, for example, by resistance feedback control, oscillation of the amount of contraction of the shape memory wire 6 occurs near the control value (or the target value). This causes the moving body pushing member 3 connected to the shape memory wire 6 to oscillate in the state shown in FIG. 2D. However, in the state shown in FIG. 2D, the moving body 2 that serves as the driving portion of the actuator is separated from the moving body pushing member 3. Therefore, the moving body 2 can be kept stationary at the position of the stopper 42 without being affected by the oscillation caused by the resistance feedback control.

On the other hand, when the moving body 2 is to be kept stationary at the position of the stopper 41, the actuator is to assume the state shown in FIG. 2A. Since the elastic force of the bias spring 52 for the moving body pushing member is stronger than the elastic force of the bias spring 51 for the moving body, the moving body 2 is kept stationary at the position of the stopper 41. In this state, the shape memory wire 6 has nothing to do with driving of the moving body 2. Therefore, the moving body 2 can be kept stationary at the position of the stopper 41 without being affected by oscillation of the shape memory wire 6.

In this embodiment, the above described advantages can also be achieved if the bias spring 51 (second bias member) for the moving body is replaced by a spring having different diameters at both ends like what is called a battery spring used as a battery contact. In this case, the length of the bias spring 51 for the moving body can be shortened, so that the required space can be reduced.

SECOND EMBODIMENT

Figure 3:
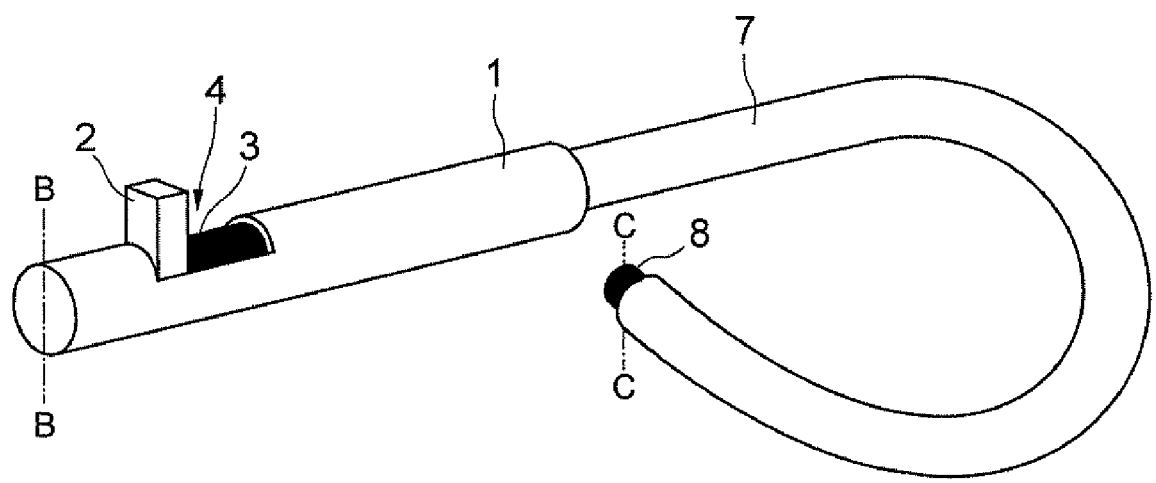
FIG. 3 is a perspective view of a shape memory alloy actuator according to a second embodiment of the present invention.
Figure 4:
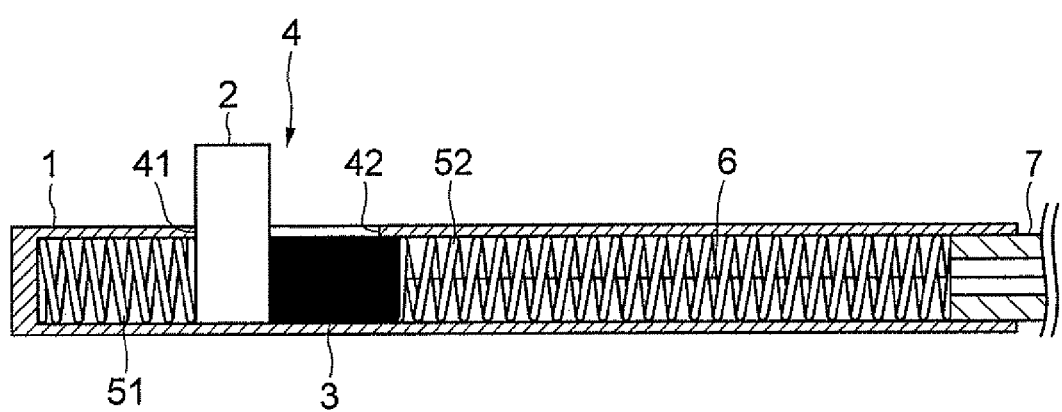
FIG. 4 is a cross sectional view of the shape memory alloy actuator according to the second embodiment taken along line B-B in FIG. 3.
Figure 5:
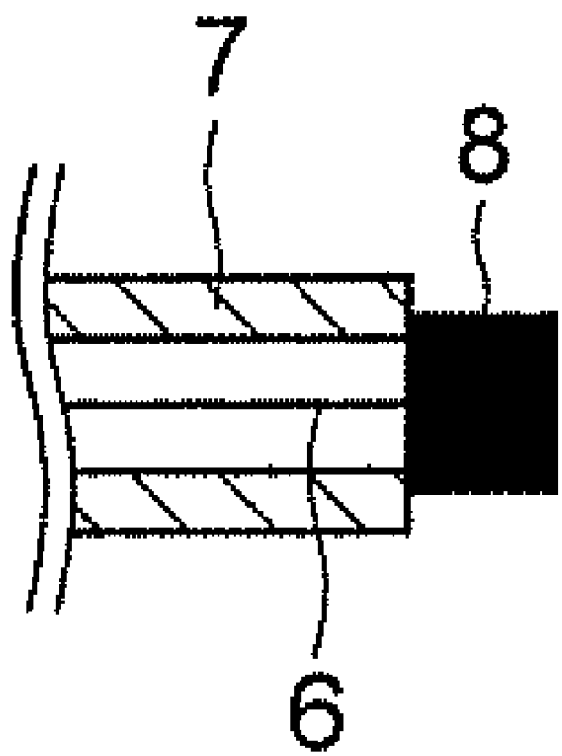
FIG. 5 is a cross sectional view of the shape memory alloy actuator according to the second embodiment taken along line C-C in FIG. 3.

FIG. 3 is a perspective view of a shape memory alloy actuator according to a second embodiment of the present invention. FIG. 4 is a cross sectional view of the actuator taken along line B-B in FIG. 3. FIG. 5 is a cross sectional view taken along line C-C in FIG. 3. In the second embodiment, the portions same as those in the first embodiment will be denoted by the same reference signs to omit redundant description.

A part of a tube 7 is inserted into a cylinder 1 and fixed therein. A shape memory wire 6 passes through the interior of the tube 7. At the end of the tube 7 is provided a wire fixing member 8. One end of the shape memory wire 6 is fixed to the wire fixing member 8. The wire fixing member 8 is fixed to the end portion of the tube 7.

FIG. 4 is a cross sectional view taken along line B-B in FIG. 3. An end portion of the tube 7 is inserted into an end portion of the cylinder 1 and fixed thereto. One end of a bias spring 52 for a moving body pushing member is supported by one end of the tube 7. One end of the shape memory wire 6 is attached to the moving body pushing member 3. The shape memory wire 6 passes through the bias spring 52 for the moving body pushing member and then through the tube 7.

FIG. 5 is a cross sectional view taken along line C-C in FIG. 3. The other end of the shape memory wire 6 passing through the tube 7 that is opposite to the end connected to the moving body pushing member 3 is fixed by the wire fixing member 8 at the other end of the tube 7 that is opposite to the end fixed to the cylinder 1. As described above, the wire fixing member 8 is fixed to one end of the tube member 7.

In this embodiment shown in FIG. 3, positional changes caused by changes in the status of the shape memory wire 6 are similar to those in the embodiment shown in FIG. 1, and description thereof will be omitted. In this embodiment, the use of the tube 7 allows the length of the shape memory wire 6 to be made larger. Therefore, it is possible to increase the amount of contraction of the shape memory wire 6 caused by phase transformation, the amount of contraction being proportional to its length. Thus, the drive stroke of the actuator can be made larger.

Furthermore, since the tube 7 is resilient and bendable, it is possible to save space by bending a portion of the tube 7. In addition, the actuator can be accommodated in an apparatus that might be bent. In connection with this, when the bending angle of the tube 7 changes at a time when the moving body 2 is controlled to be kept at the position of the stopper 42, the position of the moving body pushing member 3 will change due to a difference between the inner diameter of the tube 7 and the outer diameter of the wire 6. This can cause a change in the position of the moving body 2. In this embodiment, however, such a change in the position can be prevented from occurring by controlling the position of the moving body pushing member 3 to be kept sufficiently away from the moving body 2.

As per the above, the shape memory alloy actuator according to the present invention can be advantageously applied to a shape memory alloy actuator that utilizes changes in the shape of a shape memory alloy caused by changes in the temperature. In particular, the present invention can be suitably applied to a shape memory alloy actuator that is controlled by feedback.

The present invention advantageously provides a shape memory alloy actuator using a shape memory alloy in which oscillation of a moving body is prevented from occurring by mechanically restraining the moving body in position.

What is claimed is:

1. A shape memory alloy actuator that transmits a change in the shape of a shape memory alloy caused by a change in the temperature to a moving body to change the position of the moving body, comprising:
   a fixed member to which one end of the shape memory alloy is fixed;
   a moving body pushing member to which the other end of the shape memory alloy is mechanically linked;
   a first bias member that exerts an external force on the moving body pushing member in a direction opposite to a direction of change in the shape of the shape memory alloy caused by heating;
   a second bias member that exerts an external force on the moving body in a direction same as the direction of change in the shape of the shape memory alloy caused by heating;
   a first stopper that restricts movement of the moving body to a predetermined position with respect to a direction of movement of the moving body caused upon heating the shape memory alloy; and
   a second stopper that restricts movement of the moving body to a predetermined position with respect to a direction of movement of the moving body caused upon cooling the shape memory alloy, wherein
   the moving body is disposed in such a way as to be capable of being in contact with the moving body pushing member, and
   the moving body and the moving body pushing member are separated apart when the moving body is in a state in which it is restrained at the position of the first stopper after movement of the moving body pushing member and the moving body caused by a change in the shape of the shape memory alloy by heating.

2. A shape memory alloy actuator that transmits a change in the shape of a shape memory alloy caused by a change in the temperature to a moving body to change the position of the moving body, comprising:
   a hollow tube member through which the shape memory alloy passes, one end of the tube member being fixed to one end of the shape memory alloy;
   a moving body pushing member mechanically linked with the other end of the shape memory alloy;
   a support member to which the other end of the tube member is fixed;
   a first bias member that exerts an external force on the moving body pushing member in a direction opposite to a direction of change in the shape of the shape memory alloy caused by heating;
   a moving body that is moved with the moving body pushing member by a change in the shape of the shape memory alloy;
   a second bias member that exerts an external force on the moving body in a direction same as the direction of change in the shape of the shape memory alloy caused by heating;
   a first stopper that restricts movement of the moving body to a predetermined position with respect to a direction of movement of the moving body caused upon heating the shape memory alloy; and
   a second stopper that restricts movement of the moving body to a predetermined position with respect to a direction of movement of the moving body caused upon cooling the shape memory alloy, wherein the moving body is disposed in such a way as to be capable of being in contact with the moving body pushing member, and the moving body and the moving body pushing member are separated apart when the moving body is in a state in which it is restrained at the position of the first stopper after movement of the moving body pushing member and the moving body caused by a change in the shape of the shape memory alloy by heating.

3. A shape memory alloy actuator according to claim 1 or 2, wherein the second bias member is an elastic member having different diameters at both ends.

4. A shape memory alloy actuator according to claim 1 or 2, wherein the elastic modulus of the second bias member is smaller than the elastic modulus of the first bias member.

5. A shape memory alloy actuator according to claim 2, wherein the tube member is resilient.

* * * * *